Patented Sept. 10, 1946

2,407,551

UNITED STATES PATENT OFFICE 2,407,551

METHOD OF MAKING LEAD ALKYLS

Sam D. Heron, Detroit, Mich., assignor to Ethyl Corporation, New York, N. Y., a corporation of Delaware No Drawing. Application September 7, 1944, Serial No. 553,117

1 Claim. (Cl. 260—437)

This invention relates to the manufacture of lead alkyls with a lead sodium alloy and its principal object is to inhibit the agglomeration of the free lead particles left in the autoclave by the reaction.

By all methods of manufacture used in the making of lead alkyls by a lead sodium process more lead is used in the lead sodium alloy than is required for forming the lead alkyl. The excess lead is left in the autoclave as fine lead particles which agglomerate. This agglomeration may affect the efficiency of the lead sodium reaction and more particularly the efficiency of the steam distillation. A small amount of graphite mixed with the lead sodium alloy inhibits the agglomeration of the lead particles. For example, by weight, 1 percent of high quality, finely divided flake graphite, based on the lead sodium alloy employed, substantially inhibits the agglomeration. If a lower quality of graphite is used, larger amounts are required.

The graphite may be placed in the autoclave before the lead sodium alloy is added or the graphite may be added to or with the lead sodium alloy. A stirring mechanism is commonly employed and this mixes the graphite with the alloy.

I claim:

In the process of making a lead alkyl with a lead sodium alloy the step which includes mixing a small amount of graphite with the lead sodium alloy.

SAM D. HERON.